(12) United States Patent
Harvey et al.

(10) Patent No.: US 8,192,153 B2
(45) Date of Patent: Jun. 5, 2012

(54) AEROFOIL MEMBERS FOR A TURBOMACHINE

(75) Inventors: Neil William Harvey, Derby (GB); Mark Richard Stokes, Leicestershire (GB); David Andrew Bagshaw, Cheshire (GB)

(73) Assignee: Rolls-Royce PLC (GB)

( * ) Notice: Subject to any disclaimer, the term of this patent is extended or adjusted under 35 U.S.C. 154(b) by 1318 days.

(21) Appl. No.: 12/036,371

(22) Filed: Feb. 25, 2008

(65) Prior Publication Data

US 2008/0267772 A1     Oct. 30, 2008

(30) Foreign Application Priority Data

Mar. 8, 2007   (GB) .................................. 0704426.6

(51) Int. Cl.
    *F04D 29/54*   (2006.01)
(52) U.S. Cl. .................... 415/191; 416/242; 416/243
(58) Field of Classification Search .............. 415/191, 415/192; 416/223 A, 223 R, 242, 243
    See application file for complete search history.

(56) References Cited

U.S. PATENT DOCUMENTS

| | | | | |
|---|---|---|---|---|
| 2,714,499 | A * | 8/1955 | Warner | 416/243 |
| 3,529,631 | A * | 9/1970 | Gilbert | 138/39 |
| 3,989,406 | A * | 11/1976 | Bliss | 415/1 |
| 4,131,387 | A * | 12/1978 | Kazin et al. | 415/119 |
| 4,208,167 | A * | 6/1980 | Yasugahira et al. | 415/210.1 |
| 4,653,976 | A | 3/1987 | Blair et al. | |
| 4,726,737 | A * | 2/1988 | Weingold et al. | 416/223 A |
| 4,741,667 | A * | 5/1988 | Price et al. | 415/191 |
| 4,778,338 | A * | 10/1988 | Bessay | 415/181 |
| 5,192,193 | A * | 3/1993 | Cooper et al. | 416/186 R |
| 5,466,123 | A * | 11/1995 | Rose | 415/182.1 |
| 5,716,192 | A * | 2/1998 | Phillips et al. | 415/115 |
| 5,779,443 | A * | 7/1998 | Haller et al. | 415/191 |
| 5,906,474 | A * | 5/1999 | Haller et al. | 415/191 |

(Continued)

FOREIGN PATENT DOCUMENTS

GB     2199379 A     7/1988

OTHER PUBLICATIONS

C.H. Sieverding; "Secondary Flows in Straight and Annular Turbine Cascades"; Thermodynamics and Fluids of Turbomachinery, NATO; 1985; vol. 11, pp. 621-624.

(Continued)

*Primary Examiner* — Edward Look
*Assistant Examiner* — Adam Benson
(74) *Attorney, Agent, or Firm* — McCormick, Paulding & Huber LLP

(57) ABSTRACT

A circumferential row of aerofoil members span an annular duct for carrying a flow of compressible fluid. The duct is centered on the axis of a turbomachine. Pressure and suction surfaces of neighboring aerofoil members bound respective sectoral passages which receive the flow of compressible fluid. The row of aerofoil members includes at least one radial endwall to which the tangent to the trailing edge of each aerofoil member at midspan is substantially orthogonal. Each aerofoil member has reverse compound lean. Each aerofoil member further has a leading edge which has a position at the endwall which is upstream of its position at midspan. The endwall at each sectoral passage has a non-axisymmetrical cross-section formed by a region that, in meridional section, is convexly profiled immediately adjacent the pressure surface and a region that, in meridional section, is concavely profiled immediately adjacent the suction surface.

18 Claims, 13 Drawing Sheets

U.S. PATENT DOCUMENTS

| | | | | |
|---|---|---|---|---|
| 5,947,683 | A * | 9/1999 | Kobayashi | 415/208.1 |
| 6,017,186 | A * | 1/2000 | Hoeger et al. | 415/181 |
| 6,036,438 | A * | 3/2000 | Imai | 415/192 |
| 6,071,077 | A * | 6/2000 | Rowlands | 416/223 A |
| 6,079,948 | A * | 6/2000 | Sasaki et al. | 416/237 |
| 6,283,713 | B1 * | 9/2001 | Harvey et al. | 416/193 A |
| 6,299,412 | B1 * | 10/2001 | Wood et al. | 416/223 A |
| 6,312,219 | B1 * | 11/2001 | Wood et al. | 415/191 |
| 6,419,446 | B1 * | 7/2002 | Kvasnak et al. | 415/191 |
| 6,461,110 | B1 * | 10/2002 | By et al. | 416/223 A |
| 6,491,493 | B1 * | 12/2002 | Watanabe et al. | 415/191 |
| 6,508,630 | B2 * | 1/2003 | Liu et al. | 416/228 |
| 6,554,569 | B2 * | 4/2003 | Decker et al. | 415/192 |
| 6,561,761 | B1 * | 5/2003 | Decker et al. | 415/173.1 |
| 6,565,324 | B1 * | 5/2003 | Phillipsen et al. | 416/236 R |
| 6,669,445 | B2 * | 12/2003 | Staubach et al. | 416/193 A |
| 6,709,233 | B2 * | 3/2004 | Haller | 415/192 |
| 6,709,239 | B2 * | 3/2004 | Chandraker | 416/238 |
| 6,755,612 | B2 * | 6/2004 | Shahpar et al. | 415/192 |
| 6,779,977 | B2 * | 8/2004 | Lagrange et al. | 416/223 A |
| 6,827,555 | B2 * | 12/2004 | Yang | 416/197 R |
| 6,830,432 | B1 * | 12/2004 | Scott et al. | 416/97 R |
| 6,848,884 | B2 * | 2/2005 | Kawasaki | 415/199.5 |
| 6,893,225 | B2 * | 5/2005 | Crall et al. | 416/241 R |
| 6,971,845 | B2 * | 12/2005 | Weaver | 415/189 |
| 7,048,509 | B2 * | 5/2006 | Tominaga et al. | 416/223 A |
| 7,121,792 | B1 * | 10/2006 | Fessou et al. | 415/191 |
| 7,217,096 | B2 * | 5/2007 | Lee | 416/97 R |
| 7,217,101 | B2 * | 5/2007 | Harvey | 416/223 A |
| 7,220,100 | B2 * | 5/2007 | Lee et al. | 415/191 |
| 7,354,243 | B2 * | 4/2008 | Harvey | 415/191 |
| 7,465,155 | B2 * | 12/2008 | Nguyen | 416/193 R |
| 7,481,614 | B2 * | 1/2009 | Tomita et al. | 415/115 |
| 7,625,181 | B2 * | 12/2009 | Matsuda et al. | 416/193 A |

OTHER PUBLICATIONS

K. Takeishi, et al; "An Experimental Study of the Heat Transfer and Film Cooling on Low Aspect Radio Turbine Nozzles"; The American Society of Mechanical Engineers Paper; 1989; 89-GT-187, pp. 1-9; New York, NY.

Martin G. Rose; "Non-Axisymmetric Endwall Profiling in the HP NGVs of an Axial Flow Gas Turbine"; The American Society of Mechanical Engineers Paper; 1994; 94-GT-249, pp. 1-8; New York, NY.

J.C. Hartland and D.G. Gregory-Smith; "Non-Axissymmetric Endwall Profiling in a Turbine Rotor Blade"; The American Society of Mechanical Engineers Paper; 1998; 98-GT-525, pp. 1-10; New York, NY.

Neil W. Harvey, et al; "Non-Axissymmetric Turbine Endwall Design: Part 1—Three-Dimensional Linear Design System"; The American Society of Mechanical Engineers Journal of Turbomachinery; 2000; vol. 122, 278-285.

J.C. Hartland, et al; "Non-Axisymmetric Turbine Endwall Design; Part II Experimental Validation"; The American Society of Mechanical Engineers Paper; 1999; 99GT-338; pp. 1-10; New York, NY.

Grant Ingram, et al; "Investigation of a Novel Secondary Flow Feature in a Turbine Cascade With End Wall Profiling"; The American Society of Mechanical Engineers Journal of Turbomachinery; 2005; vol. 127, pp. 209-214.

Grant Ingram, et al; "The Effect of End-Wall Profiling on Secondary Flow and Loss Development in a Turbine Cascade"; Proceedings of the American Society of Mechanical Engineers Turbo Expo 2002; Jun. 3-6, 2002; GT-2002-30339, pp. 1-11; Amsterdam, The Netherlands.

O.P. Sharma, et al; "A Perspective on the Use of Physical and Numerical Experiments in the Advancement of Design Technology for Axial Flow Turbines"; The American Institute of Aeronautics and Astronautics; 2003; ISABE-2003-1035, pp. 1-13; Cleveland, Ohio.

G.A. Zess and K.A. Thole; "Computational Design and Experimental Evaluation of Using a Leading Edge Fillet on a Gas Turbine Vane"; The American Society of Mechanical Engineers Journal of Turbomachinery; 2002; vol. 124, pp. 167-175.

Arun K. Saha, et al; "The Role of Leading-Edge Contouring on End-Wall Flow and Transfer: Computations and Experiments"; Proceedings of GT2006, The American Society of Mechanical Engineers Turbo Expo 2006: Power for Land, Sea and Air; May 8-11, 2006; GT2006-91318, pp. 1-14; Barcelona, Spain.

Jochen Gier, et al.; "Improving 3D Flow Characteristics in a Multistage LP Turbine by Means of Endwall Contouring and Airfoil Design Modification Part 2: Numerical Simulation and Analysis"; Proceedings of The American Society of Mechanical Engineers Turbo Expo 2002; Jun. 3-6, 2002; GT-2002-30353; pp. 1-11; Amsterdam, The Netherlands.

D. Bradshaw, et al; "An Experimental Study of Reverse Compound Lean in a Linear Turbine Cascade"; Proceedings of the I MECH E., Journal of Power and Energy; 2005; Series A, vol. 219, No. 6, pp. 443-449.

* cited by examiner

Fig. 12. Static pressure coefficient (Cp) - Midspan

AEROFOIL MEMBERS FOR A TURBOMACHINE

CROSS-REFERENCE TO RELATED APPLICATION

This application is entitled to the benefit of British Patent Application No. GB 0704426.6 filed on Mar. 8, 2007.

FIELD OF THE INVENTION

The present invention relates to a turbomachine in which there are one or more rows of aerofoil members in an annular duct centred on the axis of the turbomachine, the duct carrying, in use, a flow of compressible fluid. The invention is particularly concerned with improving the control of the fluid flow past rows of such aerofoil members, which may be fixed vanes or blades rotating about the central axis of the duct.

BACKGROUND OF THE INVENTION

In typical turbomachines, each row of aerofoil members divides a duct into a series of sectoral passages, each bounded by the opposed suction and pressure surfaces of a neighbouring pair of members and the radially inner and outer walls of the duct. The flow field within the sectoral passages is complex and includes a number of secondary vortical flows, which are a major source of energy loss. Reference can be made to Sieverding (1985) "Secondary Flows in Straight and Annular Turbine Cascades", Thermodynamics and Fluids of Turbomachinery, NATO, Vol. 11, pp 621-624 for a detailed discussion of these flows. Their relative importance increases with increase of aerodynamic duty or decrease of aspect ratio. Not only is there energy dissipation in the secondary flows themselves, but they can also affect adversely the fluid flow downstream because they cause deviation of the exit angles of the flow from the row of aerofoil members.

The endwall boundary layers give rise to a substantial part of these secondary flows. FIG. 1 shows a flow model illustration taken from Takeishi et al (1989), "An Experimental Study of the Heat Transfer and Film Cooling on Low Aspect Ratio Turbine Nozzles" ASME Paper 89-GT-187. This shows part of a row of turbine blades projecting from a cylindrical surface that forms a radially inner endwall of the annular passage into which the blade aerofoil extends. The principal flow features as shown in the model are:

Rolling up of the inlet boundary layer L into a horseshoe vortex H at the blade leading edge due to the pressure variation at the intersection of the leading edge and the endwall. The pressure surface side leg of this flow becomes the core of a passage vortex P, which is a dominant part of the secondary flow. On the endwall, beneath the passage vortex, a new boundary layer is formed, indicated as crossflow B, which starts in the pressure side corner of the endwall of the blade passage.

Upstream of the crossflow B the inlet boundary layer is deflected across the passage, as indicated by crossflow A. The endwall separation line S marks the furthest penetration of the bottom of the inlet boundary layer A into the blade passage and divides it from the new boundary layer (crossflow B) forming downstream of it.

The new endwall boundary layer, crossflow B, continues onto the blade suction surface until it separates, along an aerofoil separation line V, and feeds into the passage vortex P. The horseshoe vortex suction side leg, referred to as the counter vortex U in the drawing, remains above the passage vortex P and moves away from the endwall as the passage vortex grows.

A small corner vortex C may be initiated in the corner region between the blade suction surface and the endwall, rotating in the opposite sense to the passage vortex.

Also illustrated in FIG. 1 are the attachment line T which represents the division of the incoming boundary layer flow L between adjacent passages, and the saddle point D, where the attachment line T and the endwall separation line S intersect.

Typically, the passage vortex will increase the exit angle of the flow at the endwall (referred to as "over turning") with the compensatory reduction in exit angle away from the wall (referred to as "under turning"). These effects give rise to deviations of the inlet flow to the next aerofoil row, causing the angle of incidence of the flow on the aerofoils to vary positively or negatively from the design value and so reduce the aerodynamic efficiency of the flow.

There have been a number of proposals for reducing the secondary flows in the sectoral passages of a turbomachine.

Axisymmetric endwall profiling alters the endwall height by the same extent across the pitch. Axisymmetric geometries can affect the flow field, by causing local diffusion and accelerations independent of the aerofoil shape. The aim of changing the endwall shape by this means is usually related to achieving "area ruling". The diffusion or acceleration does not have a direct impact on the formation of secondary flow structures.

U.S. Pat. No. 4,778,338 proposes a methodology for axisymmetric endwall profiling.

Non-axisymmetric endwall profiling alters the endwall height across the pitch, typically in addition to the axial direction. This freedom of design gives control over the static pressures near the endwall surface at any point in the passage. Rose, (1994), Non-axisymmetric Endwall Profiling in the HP NGVs of an Axial Flow Gas Turbine, ASME Paper No. 94-GT-249 demonstrates the effects of non-axisymmetric endwall profiling on the circumferential static pressure distribution at blade exit. The author also presents a CFD study where profiling is successfully used to reduce rim-seal leakage flows caused by non-uniform static pressures. Further studies of non-axisymmetric endwall profiling are reported by Hartland, Gregory-Smith and Rose, (1998), Non-Axisymmetric Endwall Profiling in a Turbine Rotor Blade, ASME Paper 98-GT-525; Harvey, Rose, Shahpar, Taylor, Hartland, and Gregory-Smith, Non-axisymmetric turbine endwall design: Part I. Three-dimensional design system, ASME J. Turbomachinery, 2000, 122, 278-285; and Hartland, Gregory-Smith, Harvey and Rose, (1999), Non-Axisymmetric Turbine Endwall Design: Part II Experimental Validation, ASME Paper 99-GT-338. Ingram, Gregory-Smith, Rose, Harvey, and Brennan, (2002), The effect of end-wall profiling on secondary flow and loss development in a turbine cascade, ASME paper GT2002-30339 provide a review of earlier work and explain that non-axisymmetric endwall profiling works by reducing the cross passage pressure gradient at the endwall by means of streamline curvature. The authors also note that the aim of their profiling designs was to reduce this cross passage gradient, which results in less secondary flow and therefore loss. Ingram, Gregory-Smith and Harvey, (2005), Investigation of a novel secondary flow feature in a turbine cascade with endwall profiling, Journal of turbomachinery transactions of the ASME 127(1): 209-214 discusses the limits of endwall profiling in terms of maximum values of perturbation magnitudes and endwall curvatures.

U.S. Pat. Nos. 3,529,631 and 6,283,713 propose forms of non-axisymmetric endwall profiling.

SUMMARY OF THE INVENTION

The present invention is at least partly based on the realisation that reverse compound lean can be used to control or alter the flow fields in a turbomachine. In general terms, the present invention provides a circumferential row of aerofoil members for location in an annular duct centred on the axis of a turbomachine, the duct carrying, in use, a flow of compressible fluid, each aerofoil member having reverse compound lean, and further each aerofoil having a shaped leading edge.

A first aspect of the present invention provides a circumferential row of aerofoil members which, in use, span an annular duct for carrying a flow of compressible fluid, the duct being centred on the axis of a turbomachine; pressure and suction surfaces of neighbouring aerofoil members bounding respective sectoral passages which receive the flow of compressible fluid, and the row having at least one radial endwall to which the tangent to the trailing edge of each aerofoil member at midspan is substantially orthogonal. Each aerofoil member has reverse compound lean, and further has a leading edge which has a position at the endwall which is upstream of its position at midspan.

DETAILED DESCRIPTION OF THE PREFERRED EMBODIMENTS

Before describing aspects, optional features and detailed embodiments of the present invention, it is helpful to provide an overview of turbomachine geometry and to define certain terms useful for understanding the present invention.

Figure 1:
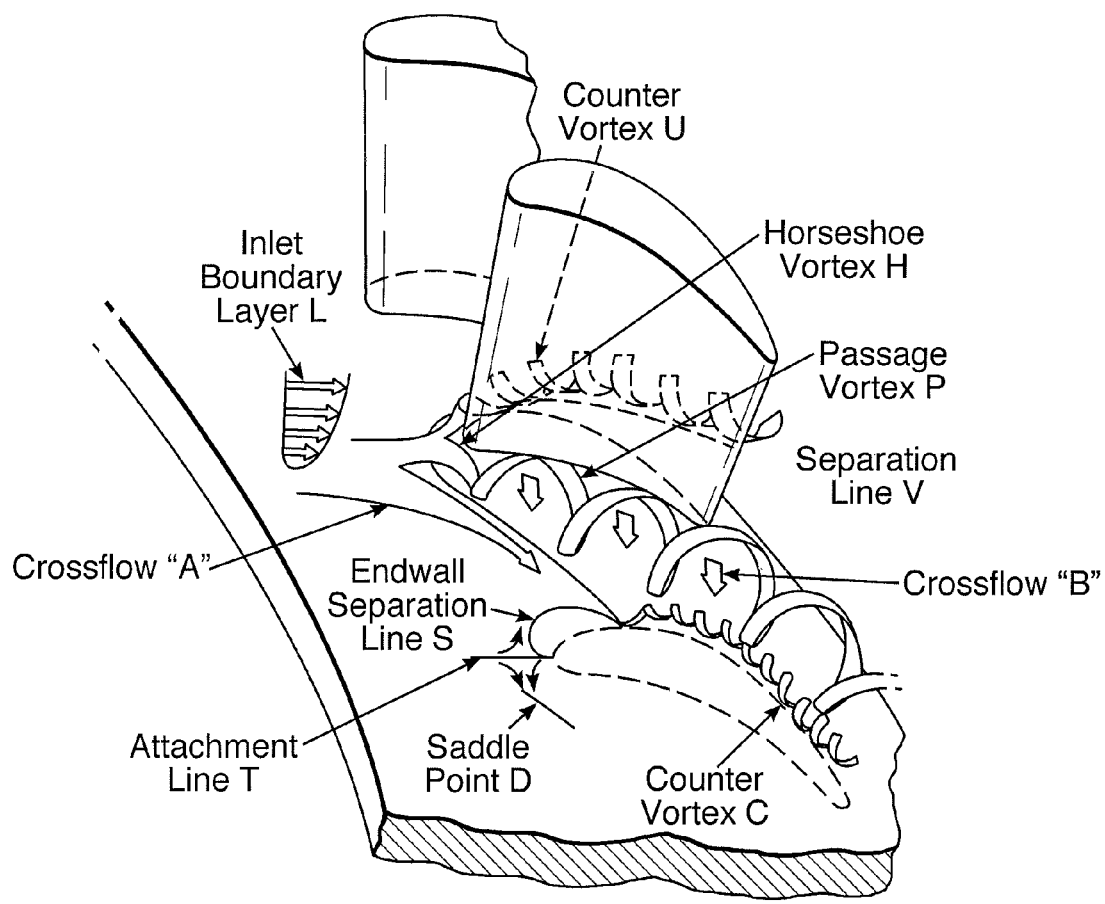
FIG. 1 is an illustration of a prior art Takeishi endwall secondary flow model.
Figure 2:
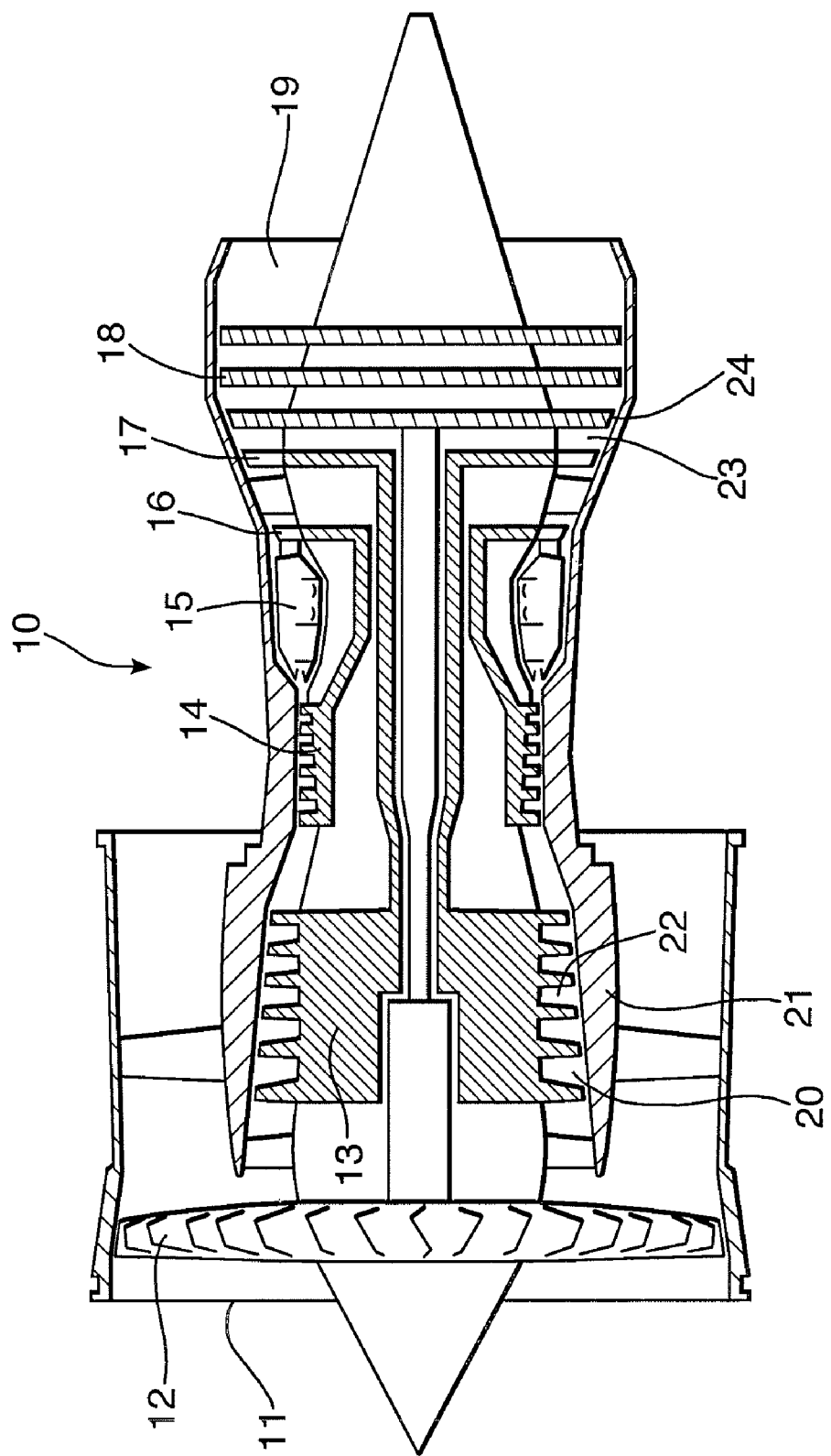
FIG. 2 is a schematic meridional section of a ducted fan, axial flow gas turbine of generally conventional configuration.

The gas turbine 10 of FIG. 2 is an example of a turbomachine of generally conventional configuration, comprising an air intake 11, ducted fan 12, intermediate and high pressure compressors 13,14 respectively, combustion chambers 15, high, medium and low pressure turbines 16,17,18 respectively, rotating independently of each other and an exhaust nozzle 19. The intermediate and high pressure compressors 13,14 are each made up of a number of stages each formed by a row of fixed guide vanes 20 projecting radially inwards from the casing 21 into the annular gas duct through the compressor and a following row of compressor blades 22 projecting radially outwards from rotary drums coupled to the hubs of the high and medium pressure turbines 16,17 respectively. The turbines similarly have stages formed by a row of fixed guide vanes 23 projecting radially inwards from the casing 21 into the annular gas ducts through the turbine and a row of turbine blades 24 projecting outwards from a rotary hub. The high and medium pressure turbines 16,17 are single stage units. The low pressure turbine 18 is a multiple stage unit and its hub is coupled to the ducted fan 12.

Although the geometry of FIG. 2 is typical, significant variants are known. For example, in the gas turbine of FIG. 2, the fixed guide vanes and blades extend in the radial direction of the turbomachine axis. However, in other turbomachines the annular gas ducts may be inclined to the turbomachine axis as shown schematically in FIG. 3. In this case, the inclined duct 31 is still centred on the turbomachine axis 30, but the duct expands radially outwardly in the downstream direction. So much is seen in relation to the annular duct of the high and medium pressure turbines 16,17 of FIG. 2. Significantly, however, in FIG. 3 the aerofoil members 32 spanning the duct do so not in the radial direction of the turbomachine, but in a direction which is tilted to that direction and is essentially perpendicular to the overall direction of fluid flow through the duct.

Each aerofoil member (e.g. blade or guide vane) has a leading edge, a trailing edge, a pressure surface and a suction surface. Transverse cross sections through an aerofoil member provide respective aerofoil sections. Typically the leading and trailing edges of the aerofoil member are not straight lines. Thus, we define the "span line" of a leading or trailing edge as the straight line connecting the end points of the edge, e.g. at respective endwalls. Further we define the "midspan position" of a leading or trailing edge as the position on that edge which is closest to the midpoint of its span line. We also define the "midspan aerofoil section" as the aerofoil section of the aerofoil member, which contains the midspan positions of the leading and trailing edges. Indeed, when we state herein that a parameter is "at midspan", we mean that that parameter is being determined at the midspan aerofoil section.

Figure 3:
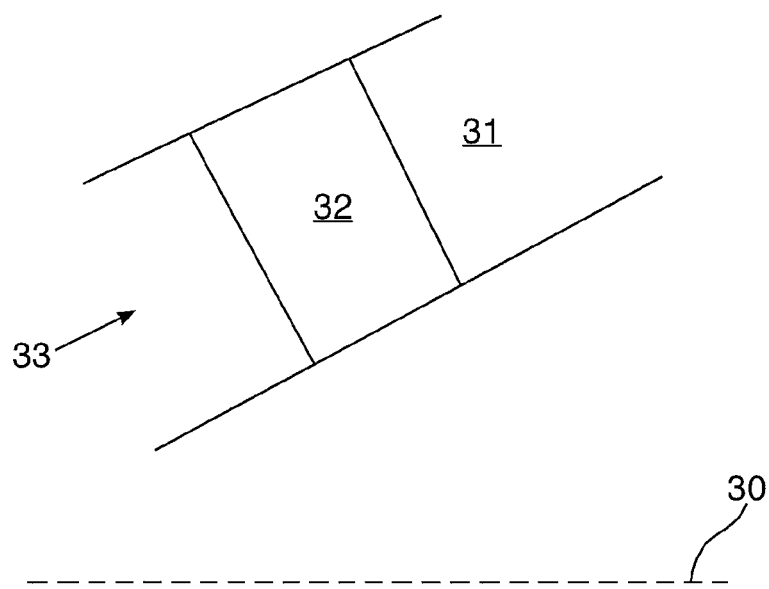
FIG. 3 is a schematic meridional section of an inclined annular duct of another axial flow gas turbine engine.

When the line connecting leading and trailing edge at the midspan aerofoil section is rotated around the axis of the turbomachine, that line sweeps around the surface of a cone (or cylinder if the midspan positions of the leading and trailing edge are radially equidistant from the turbomachine axis), the cone of course being coaxial with the turbomachine axis. We define the "streamwise directions" of an aerofoil member as the generatrices of that cone, i.e. the directions that extend to the apex of the cone and along the cone surface. Each streamwise direction lies in a respective meridional section of the duct spanned by the aerofoil member, and points in the general direction of flow along the duct (ignoring circumferential components of flow). Clearly, in a cylindrical duct the streamwise directions will be parallel to the axis of the turbomachine. However, the streamwise direction in FIG. 3 is indicated by arrow 33 and is inclined to the turbomachine axis 30.

Because the streamwise directions point in the general direction of flow along the duct, we use them to specify whether any two positions are "upstream" or "downstream" of each other. In the meridional section containing one of such positions, we can extend a line perpendicular to the respective streamwise direction across the duct and through that position. That line is then replicated (by rotating the original line about the axis of the turbomachine) in the meridional section containing the other position, and the other position is defined as being "upstream" relative to the first position if it lies on the side of the replicated line from which the flow is coming. Conversely the other position is defined as being "downstream" if it lies on the side of the replicated line to which the flow is going. However, if the other position lies on the replicated line, the two positions are defined as having "the same streamwise position".

Figure 4:
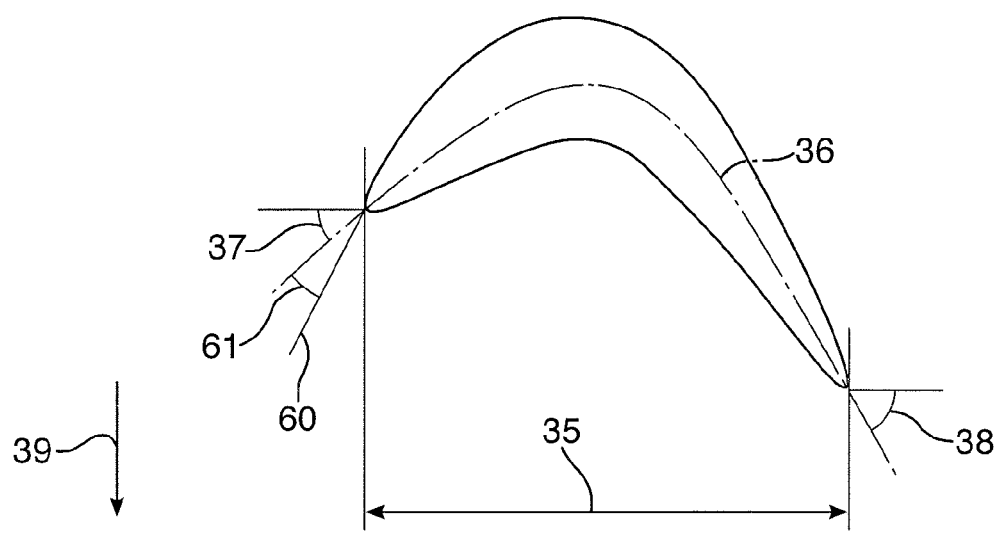
FIG. 4 is a schematic aerofoil section of a turbine blade or vane for use in an axial flow gas turbine engine.

The "axial chord length" of an aerofoil section is the spacing between the leading and trailing edge of that section, ignoring any circumferential displacement between the leading and trailing edge. FIG. 4 is a schematic aerofoil section of a turbine blade or vane, and shows a circumferential direction 39 and axial chord length 35.

Also shown in FIG. 4 is the "camber line" 36 of the aerofoil section. The camber line extends from the leading edge to the trailing edge of the section. Along circumferential directions in the plane of the aerofoil section, the camber line is equally spaced from the pressure and suction surfaces. The camber line determines the "inlet angle" (or "metal inlet angle") and "outlet angle" (or "metal outlet angle") of the aerofoil section. The inlet angle 37 is the acute angle between (i) the line of intersection of the plane of the aerofoil section and the meridional section that contains the leading edge of the aerofoil section and (ii) the direction of the camber line at the leading edge of the aerofoil section. The outlet angle 38 is the acute angle between (i) the line of intersection of the plane of the aerofoil section and the meridional section that contains the trailing edge of the aerofoil section and (ii) the direction of the camber line at the trailing edge of the aerofoil section.

For a particular operating condition of the turbomachine, the direction of flow of the working fluid that is incident at a given point on the leading edge does not, however, have to be along the camber line at that point. Thus we define the "incidence angle" at a given point on the leading edge and at 100% design speed of the turbomachine as the angle between the direction of flow of the working fluid that is incident at that point and the camber line at that point. In the aerofoil section of FIG. 4, the direction of flow 60 of the working fluid that is incident at the leading edge at 100% design speed produces incidence angle 61.

Features of the geometry of the aerofoil member can be defined by the stacking of the aerofoil sections. For example, the "tangential lean" and the "axial lean" of an aerofoil member are defined with reference to the locus of a stacking axis, which passes through a common point of each aerofoil section (the common point may be the leading edge, trailing edge or the centroid of each aerofoil section). "Tangential lean" is the displacement, with distance from an endwall, of the stacking axis in a circumferential direction (origin the turbine axis) relative to the position of the stacking axis at the endwall. Similarly, "axial lean" is the upstream or downstream displacement, with distance from an endwall, of the stacking axis relative to its position at the endwall.

The present invention is particularly concerned with a type of tangential lean, known as "reverse compound lean". The extent of tangential lean can be characterised by the displacement of the midspan aerofoil section relative to an endwall aerofoil section. "Compound lean" is when the midspan displacement tends to produce an acute angle between the stacking axis and the endwall on the pressure surface side of the stacking axis. In contrast, "reverse compound lean" is when the midspan displacement tends to produce an acute angle between the stacking axis and the endwall on the suction surface side of the stacking axis.

Clearly, if the shape of the aerofoil member is modified at the endwall, this can locally affect the locus of the stacking axis and thence the precise angle between the aerofoil stacking axis member and the endwall. Indeed, as explained more fully below, the present invention envisages such modifications. However, the modifications generally do not extend to the trailing edge portions of the aerofoil member. Thus, conveniently we take the stacking axis of the aerofoil member to pass along the trailing edge of the member.

We define the "endwall base line" as a line connecting the position (first position) where the leading edge of an aerofoil member meets an endwall and the position (second position) where the trailing edge of the aerofoil member meets the endwall, except that if the endwall has a non-axisymmetric cross section where it is met by either or both of the leading and trailing edges, then the respective position is different. In particular, if the endwall is non-axisymmetric where it is met by the leading edge, the first position is situated on the endwall as close as possible to where the leading edge meets the endwall, but at an upstream axisymmetric cross section thereof. Likewise, if the endwall is non-axisymmetric where it is met by the trailing edge, the second position is situated on the endwall as close as possible to where the trailing edge meets the endwall, but at a downstream axisymmetric cross section thereof. We then define an "orthogonal direction" of an aerofoil member at an endwall as a direction in the plane of a meridional section through the annular duct, which extends perpendicularly from the midpoint of the respective endwall base line. Rotating the orthogonal direction about the axis of the turbomachine, sweeps the orthogonal direction around the surface of a cone. Likewise, rotating the tangent to the aerofoil member trailing edge at midspan, sweeps the tangent around the surface of another cone. The cones are coaxial with the turbomachine axis, and the spread of each cone is determined by the angle between that axis and a generatrix for the cone. The tangent to the trailing edge of an aerofoil member at midspan can be considered "substantially orthogonal" to an endwall if these angles for the two cones are within 25° of each other.

Figure 5:
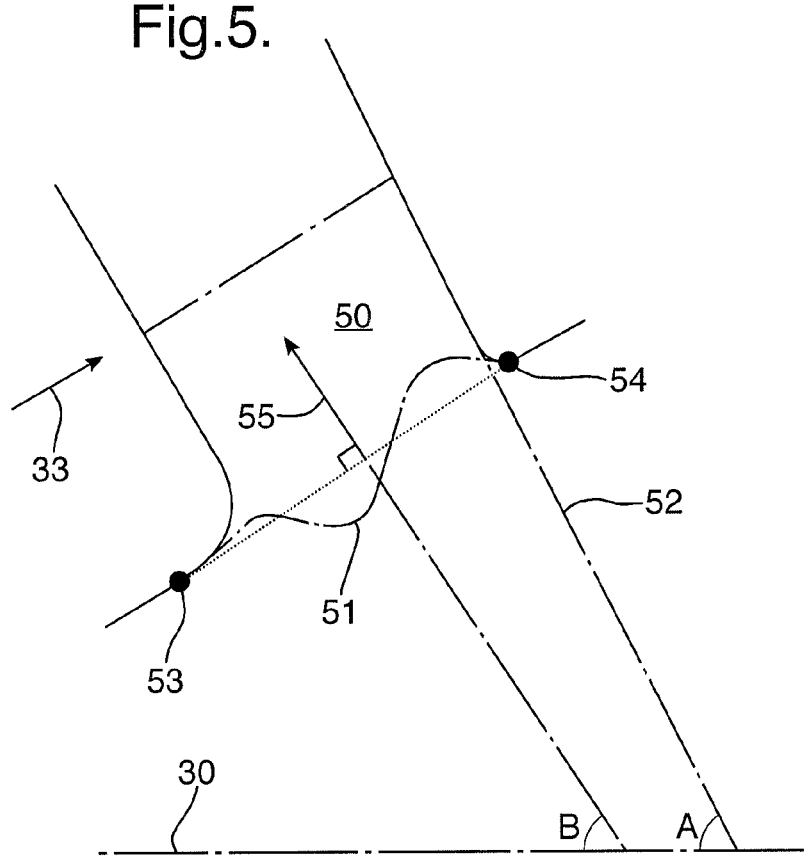
FIG. 5 is schematic meridional section through another inclined annular duct in an axial flow gas turbine engine.

For example, FIG. 5 is a schematic meridional section through an annular duct and shows schematically a side view rotational projection onto the meridional section of part of a turbine blade 50 where it meets a non-axisymmetric portion 51 (shown schematically with a dashed line) of an endwall. The blade has reverse compound lean. The midspan aerofoil section of the blade is indicated with a dot-dashed line. The tangent to the trailing edge at midspan projects onto the meridional section as a straight line 52. The endwall base line is shown as a dotted line extending between first and second positions 53,54 which are located on the endwall where it becomes axisymmetric. Orthogonal direction 55 of the turbine blade at the endwall extends perpendicularly from the midpoint of the base line, lies in the plane of the meridional section, and makes an angle B with turbomachine axis 30. The difference between angles A and B is less than 25°, whereby the blade at midspan is substantially orthogonal to the endwall.

As noted, there is a first aspect of the present invention, which provides a circumferential row of aerofoil members which, in use, span an annular duct for carrying a flow of compressible fluid, the duct being centred on the axis of a turbomachine. Pressure and suction surfaces of neighbouring aerofoil members bound respective sectoral passages which receive the flow of compressible fluid, and the row includes at least one radial endwall to which the tangent to the trailing edge of each aerofoil member at midspan is substantially orthogonal. Each aerofoil member has reverse compound lean, and further has a leading edge which has a position at the endwall, which is upstream of its position at midspan.

Typically, the row of aerofoil members is a row of turbine rotor blades or a row of turbine stator vanes. The stacking axis of the aerofoil member is conveniently the trailing edge of the member. Preferably, the angle between the turbomachine axis and a generatrix of the cone swept out by rotating the tangent to the trailing edge of the aerofoil member at midspan around the turbomachine axis is within 25° of the angle between the turbomachine axis and a generatrix of the cone swept out by rotating the orthogonal direction of the aerofoil member at the endwall. More preferably, these angles are within 10° or 5° of each other, and even more preferably the angles are substantially identical.

Physically, the effect of reverse compound lean on an aerofoil member is to alter the mainstream flow by pushing it toward endwall regions within the sectoral passage. This reduces the mass flow in the middle of the passage, which in turn reduces local loss due to the decrease in local boundary layer frictional loss. The momentum of the flow towards endwall regions also tends to restrain secondary flow structures such as the passage vortex P and horseshoe vortex H whilst they are within the sectoral passage. This restraint reduces the mixing of these secondary flow structures with other parts of the flow.

On the other hand, the reverse compound lean increases the mass flow near the endwall, strengthening the cross passage pressure gradient, which tends to reinforce the secondary flows, thus intensifying the passage vortex and consequent energy dissipation.

Sharma O, Kopper F, Stetson G, Magge S, Price F, and Ni R (2003), "*A perspective on the use of physical and numerical experiments in the advancement of design technology for axial flow turbines*", ISABE 2003, Cleveland Ohio reports an investigation into the aerodynamics of a turbine rotor blade using radial, compound leant and reverse compound leant stacks, and comes to the general conclusion that tangential lean per se does not significantly reduce losses in the blade row to which it is applied.

However, an insight of the present inventors was that a combination of reverse compound lean with forward positioning of the leading edge at the endwall can in fact produce unexpected reductions in losses. It appears that by shaping the leading edge in this way, the horseshoe vortex H that forms around the leading edge by the roll-up of the inlet boundary layer can be weakened or even suppressed. The pressure surface side leg of this flow which becomes the core of passage vortex P is thereby weakened or suppressed, which delays the roll up of crossflow B. Zess and Thole (2002), "*Computational Design and Experimental Evaluation of Using a Leading Edge Fillet on a Gas Turbine Vane*", Journal of Turbomachinery Vol. 24 ppl 67-175 and Saha A. K. Mahmood G. I. abd Acharya S. (2006), "*The role of leading-edge contouring on endwall flow and heat transfer: Computations and experiments*", Proceedings of ASME TURBO EXPO 2006, Barcelona, GT-2006-91318 have previously reported reduction of secondary flows by leading edge shaping, but not in combination with reverse compound lean.

Thus, it seems that forward positioning of the leading edge at the endwall precisely targets some of the phenomena associated with reverse compound lean that tend to increase losses, while leaving largely unaffected phenomena that reduce losses.

For highly leant geometries, the acute angle between the suction surface and the endwall becomes small and the flow velocities here can increase to such an extent that frictional losses overwhelm any benefits of flow redistribution. Thus, preferably, the reverse compound lean results in the trailing edge position at midspan being circumferentially deflected, relative to the trailing edge position at the endwall, by no more than 50% (preferably no more than 35% or 20%) of the pitch between aerofoil members. Additionally or alternatively, in the surface swept out by rotating the tangent to the trailing edge at midspan around the axis of the turbomachine, the reverse compound lean results in an angle of inclination of up to 40° (preferably up to 30° or 20°) between the tangent to the trailing edge at midspan and the projection, along the direction of said axis and into said surface, of the tangent to the trailing edge at the endwall.

At the opposite extreme, for minimally leant geometries the benefits of flow redistribution can be lost altogether. Thus preferably the reverse compound lean results in the aerofoil member trailing edge position at midspan being circumferentially deflected, relative to the trailing edge position at the endwall, by at least 5% (more preferably at least 10%) of the pitch between aerofoil members. Additionally or alternatively, in the surface swept out by rotating the tangent to the trailing edge at midspan around the axis of the turbomachine, the reverse compound lean results in an angle of inclination of at least 5° (preferably at least 10°) between the tangent to the trailing edge at midspan and the projection, along the direction of the turbomachine axis and into said surface, of the tangent to the trailing edge at the endwall.

Turning to the feature of the aerofoil whereby the leading edge has a position at the endwall which is upstream of its position at midspan, preferably this is achieved by having the axial chord of the aerofoil section of the aerofoil member at the endwall be at least 5% (more preferably 10%) longer than the axial chord of the aerofoil member at midspan. By way of an upper limit, however, preferably the axial chord of the aerofoil section of the aerofoil member at the endwall is up to 30% (preferably up to 20 or 15%) longer than the axial chord of the aerofoil member at midspan.

The increase in axial chord length at the endwall relative to the axial chord length at midspan can be achieved by notionally extending the aerofoil section at the endwall along its camber line. However, even with such a notional extension, preferably the incidence angle of the aerofoil member at the endwall and at 100% design speed of the turbomachine is within ±5° of the incidence angle of the aerofoil member at midspan and at 100% design speed.

With increasing distance from the endwall, the leading edge travels downstream until the leading edge is at the same streamwise position that it assumes at midspan. The distance along the leading edge from the endwall at which this position occurs may be at least 10% (preferably 20% or 40%) of the total distance along the leading edge from endwall to midspan. Conversely, the distance may be up to 100% (preferably up to 80% or 60%) of the total distance along the leading edge from endwall to midspan.

Additionally or alternatively, preferred characteristics of the leading edge shape of the aerofoil member can be defined by the ratio r:a, where "r" is the distance along the leading edge over which the leading edge is upstream of the leading edge at midspan, and "a" is the distance at the endwall by which the leading edge is upstream of the leading edge at midspan. r:a may be at least 1:9 and preferably at least 1:2. r:a may be no more than 9:1 and preferably no more than 5:1.

The ratio of the height of the aerofoil member to its axial chord length at midspan may be up to 10:1, and preferably up to 2:1 or 0.5:1.

A typical turbine rotor blade has an aerofoil section like that shown in FIG. 4. The tangential component of the flow through the sectoral passage created by a row of such blades changes sign from inlet to exit. This is evident from the inlet and outlet angles 37,38 (also known as "yaw" angles) which are approximately +40° and −60°, and therefore turn the flow through the streamwise direction by about 100°. With such a blade, extending the aerofoil section at the endwall along the camber line would increase the concavity of the pressure surface. Particularly, at the endwall, a highly concave pressure surface can lead to increased diffusion, low local flow velocities and an increased risk of flow separation. Thus the aerofoil member further may have an aerofoil section adjacent the endwall which is thicker than the aerofoil section at midspan. In particular, the thickening of the aerofoil section may be achieved by filling-in the pressure surface at the endwall relative to the pressure surface at midspan. Such an arrangement effectively provides a blockage, which raises local flow velocities, reduces diffusion, and prevents or reduces flow separation. Gier J, Ardey S., Eymann S, Reinmöller U, and Niehuis R, "*Improving 3D flow characteristics in a multistage LP turbine by means of endwall contouring and airfoil design modification—Part* 2: *Numerical simulation and analysis*", Proceedings of ASME TURBO EXPO 2002, *Paper GT*-2002-30353 describes an investigation into effects of aerofoil thickening.

Of course, not all turbine blades have aerofoil sections like that shown in FIG. 4. In some, the yaw angle simply increases through the passage (for example, entering at +20° and exiting at +60°, turning the flow by 40°). In others, the inlet flow is axially aligned, such as the first stage vane of a typical high pressure turbine (being the first row in the whole turbine system). In such cases, extending the aerofoil section at the endwall along the camber line will not increase the concavity of the pressure surface—in fact, it may reduce it. Thus, for these types of aerofoil member, pressure surface in-fill may not be desirable. Indeed, even for aerofoil members where the flow is turned through the streamwise direction, if the inlet flow angles are modest, typically less than 20°, pressure side in-fill may not be desirable.

Figure 6:
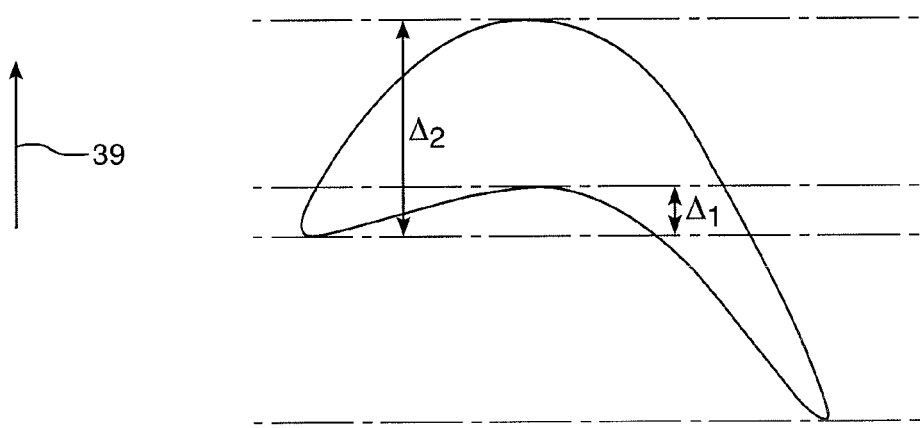
FIG. 6 is a schematic aerofoil section of another turbine blade or vane for use in an axial flow gas turbine engine.

However, when the aerofoil section at the endwall has a concave pressure surface shaped such that three tangents can be drawn to the pressure surface at respective positions adjacent the leading edge, adjacent the trailing edge, and between the leading and trailing edges, and a fourth tangent can be drawn to the suction surface, the four tangents being parallel to each other and to the plane of the meridional section containing the leading edge at the endwall, then preferably the ratio $\Delta_1:\Delta_2$ is no more than 0.3 and preferably no more than 0.2 or 0.1, $\Delta_1$ being the circumferential spacing between the tangent to the pressure surface adjacent the leading edge and the tangent to the pressure surface between the leading and trailing edges, and $\Delta_2$ being the circumferential spacing between the tangent to the pressure surface adjacent the leading edge and the tangent to the suction surface. FIG. 6 is a schematic of such an aerofoil section. The circumferential 39 direction is indicated. The four tangents to the surface of the aerofoil section are in dashed lines and the spacings $\Delta_1$ and $\Delta_2$ are indicated.

The endwall at each sectoral passage may have a non-axisymmetrical cross-section formed by a region that, in meridional section, is convexly profiled immediately adjacent the pressure surface and a region that, in meridional section, is concavely profiled immediately adjacent the suction surface. Preferably, the endwall further has a region that, in meridional section, is convexly profiled immediately adjacent the suction surface and upstream of the concavely profiled region. Such profiling seems to enhance the beneficial effect on the secondary flow structures of the forward positioning of the leading edge at the endwall.

The endwall may have an axisymmetric cross-section upstream of the leading edge of the aerofoil member at the endwall. For example, travelling in a downstream direction, the endwall may change from an axisymmetric cross-section to a non-axisymmetric cross-section at a position, which is spaced upstream from the leading edge at the endwall by a distance, which is no more than 5% (preferably no more than 20%) of the axial chord length of the aerofoil section at the endwall.

Further, the endwall may have an axisymmetric cross-section downstream of the trailing edge of the aerofoil member at the endwall. For example, travelling in a downstream direction, the endwall may change from a non-axisymmetric cross-section to an axisymmetric cross-section at a position, which is spaced downstream from the trailing edge at the endwall by a distance which is up to 1% (preferably up to 20%) of the axial chord length of the aerofoil section adjacent the endwall.

Typically, the row of aerofoil members comprises radially inner and outer endwalls. Each aerofoil member may be substantially orthogonal to both endwalls. Further, the aerofoil member may have a leading edge which has a position at each endwall which is upstream of its position at midspan.

A further aspect of the present invention provides an aerofoil member according to the first aspect.

The aerofoil member may be provided with an integral portion extending transversely to the pressure and suction surfaces at one or each end of the member for forming at least a portion of a respective endwall.

A further aspect of the present invention provides a turbomachine having at least one row of aerofoil members according to the first aspect. We now provide a discussion of detailed studies relating to the present invention.

Computational Fluid Dynamics (CFD) analyses were carried out on three blade geometries to study in particular the effect of geometry changes on surface static pressure distributions. For comparison with subsequent experimental studies, the CFD analyses were for blades in a linear cascade with upper and lower endwalls, rather than for a circumferential cascade. However, the results of the analyses and studies are expected to be applicable to blades in circumferential cascades.

The three blade geometries are:

"Datum"—a comparative example baseline geometry with flat endwalls, an orthogonal prismatic blade without tangential or axial lean, and a ratio of blade height to axial chord length at midspan of about 2.1:1.

"Redesign"—based on the "Datum" geometry but modified to incorporate reverse compound lean, forward positioning of the leading edge at the endwalls, and pressure surface fill-in.

"Redesign+PEW"—based on the "Redesign" geometry but further modified to include endwall profiling.

Figure 7:
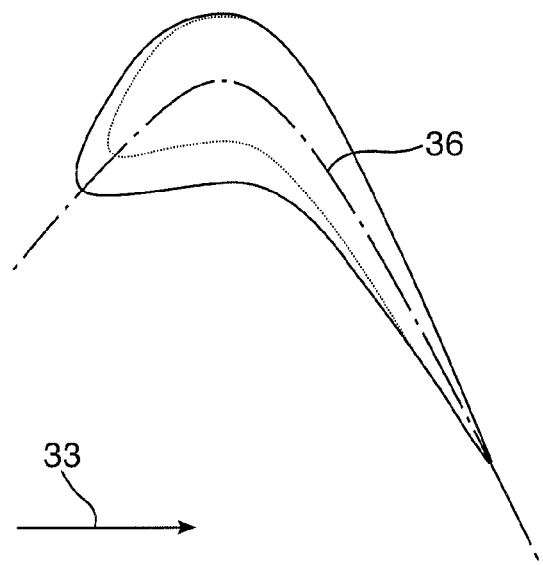
FIG. 7 are aerofoil sections of a comparative Datum aerofoil member and a Redesign aerofoil member incorporating features of the present invention.

FIG. 7 shows in dotted outline an aerofoil section of the Datum blade and superimposed in solid outline an aerofoil section of the Redesign blade at an endwall. The Redesign aerofoil section at the endwall was altered by a combination of leading edge forward positioning produced by extension along the camber line 36, and a moderate pressure surface in-fill. Arrow 33' is perpendicular to the direction of extension of the linear cascade and parallel to the upper and lower endwalls, and corresponds to a streamwise direction in a circumferential cascade. The leading edge forward positioning gave a 10% increase in axial chord length. Extension along the camber line maintained the inlet angle. The pressure surface fill-in reduced the possibility of pressure surface flow separation. The suction surface geometry was largely unaltered.

Figure 8:
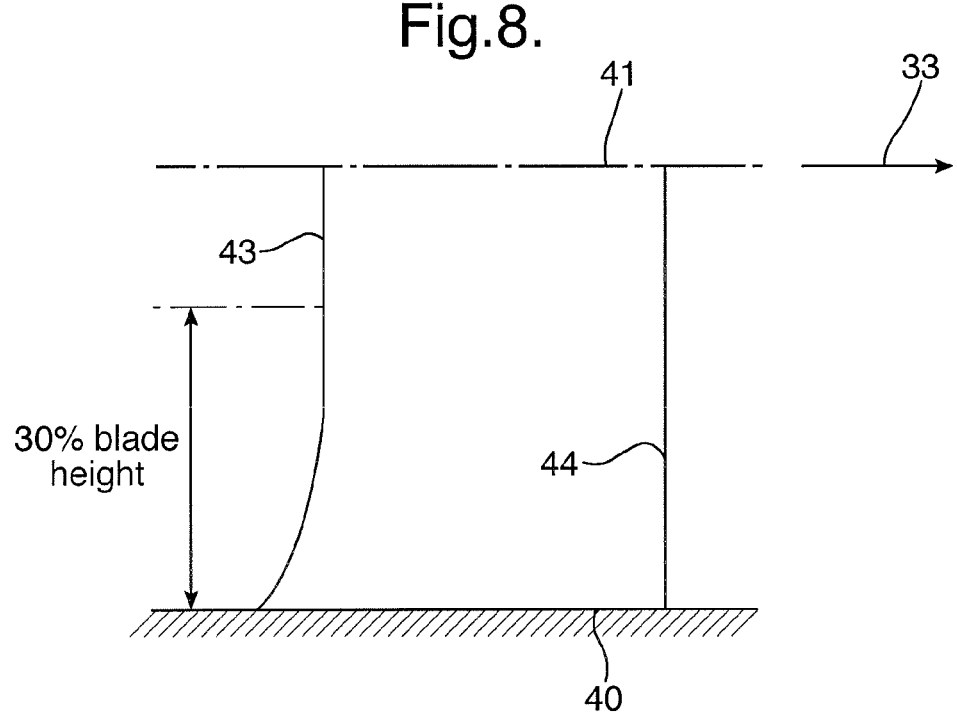
FIG. 8 is a side view from bottom endwall to midspan of the Redesign aerofoil member.

The altered blade section merged with the original Datum geometry at 30% of the blade height. FIG. 8 shows a side view of the Redesign blade from the lower endwall 40 to midspan 41, and demonstrates the forward positioning of the leading edge 43 and the merging of the altered blade section into the Datum geometry. The trailing edge 44 is unaltered.

Figure 9:
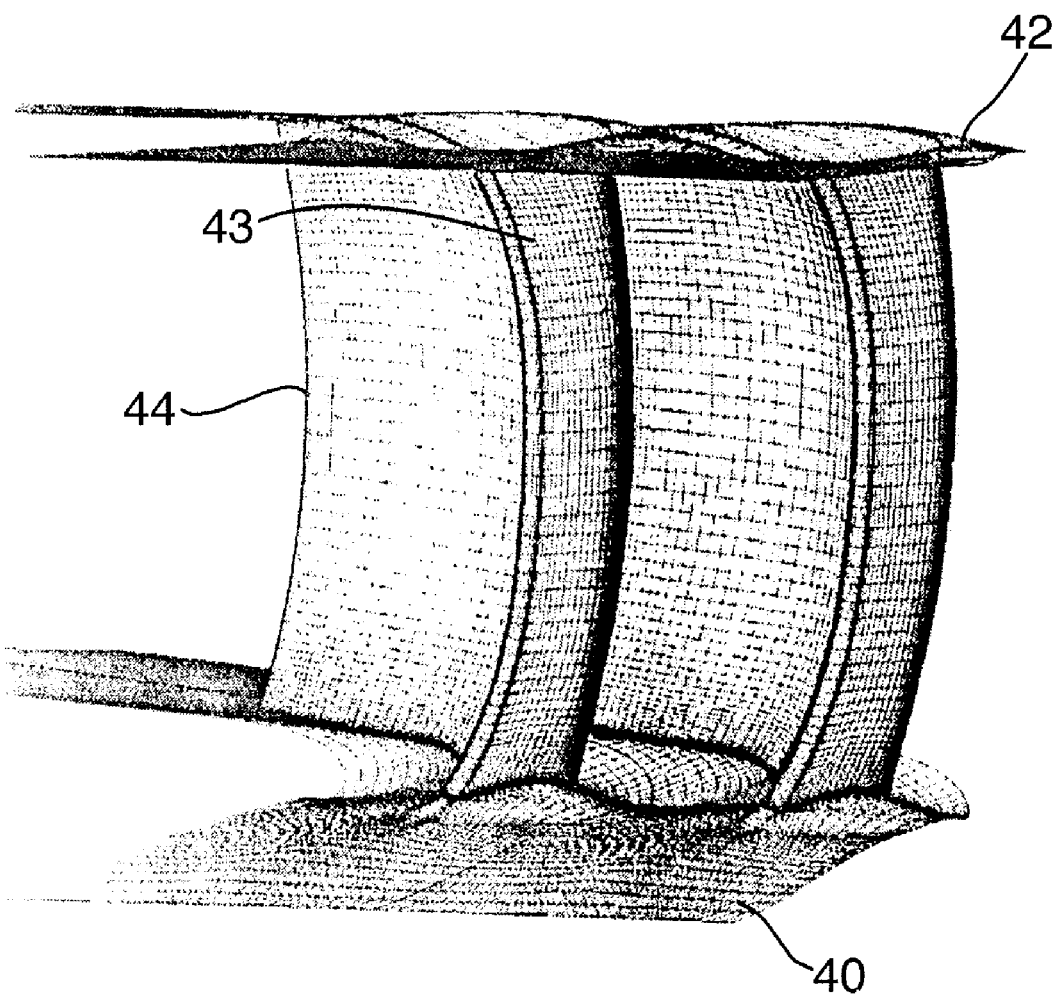
FIG. 9 is a perspective view of two adjacent Redesign+PEW aerofoil members in linear cascade.

FIG. 9 is a perspective view of two adjacent Redesign+ PEW blades and the upper 42 and lower 40 endwalls of the linear cascade, and clearly shows the reverse compound lean of this (and the Redesign) geometry.

The reverse compound lean was produced by adopting an elliptical profile for the trailing edge stacking axis. This has been shown to reduce loss relative to a prismatic reference geometry (see Bagshaw D A, Ingram G L, Gregory-Smith D G, and Stokes M R. (2005), "*An Experimental Study of Reverse Compound Lean in a Linear Turbine Cascade*", Proceedings I. Mech. E., Journal of Power and Energy, Series A, Vol. 219, No. 6, 443-449).

The reverse compound lean was characterised by a midspan angular deflection of 13% of pitch and a 15° angle of inclination of the trailing edge from the perpendicular at the endwalls.

Figure 10:
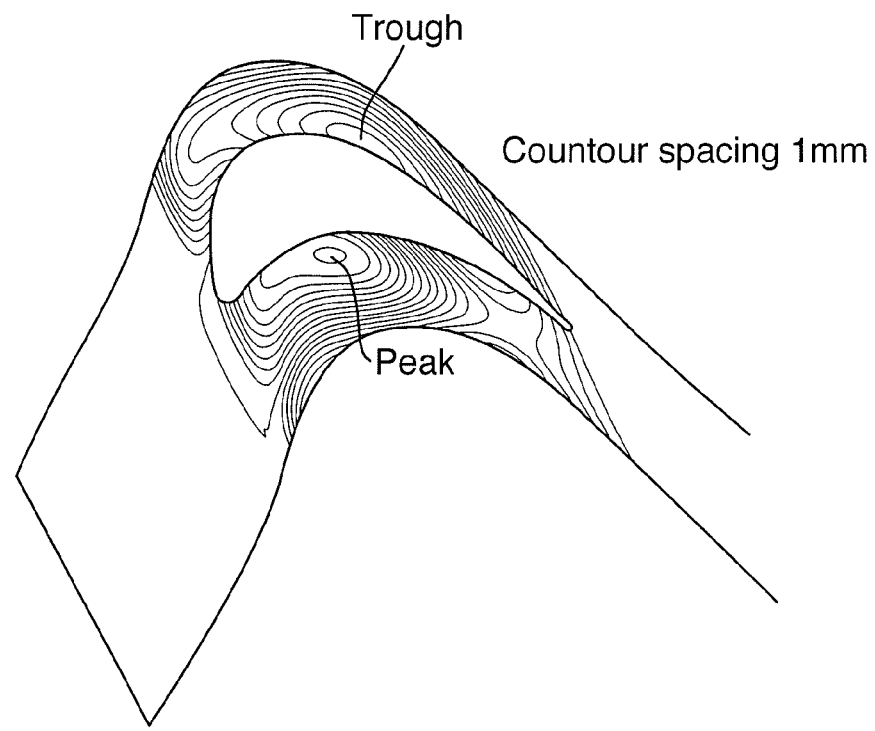
FIG. 10 shows height contours for the upper endwall of the linear cascade of FIG. 9.
Figure 11:
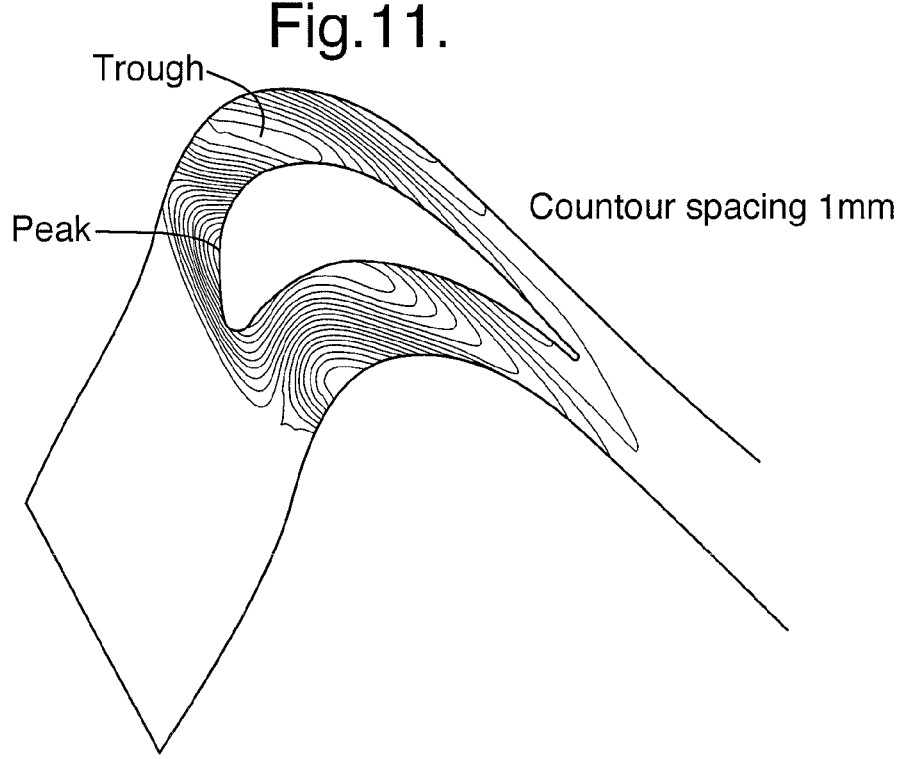
FIG. 11 shows height contours for the lower endwall of the linear cascade of FIG. 9.

Two different forms of non-axisymmetric endwall profiling were applied to the upper and lower endwalls in the Redesign+PEW geometry. However, both required the profiling to lie largely within the sectoral passage between the blades. Thus the endwall was unchanged from about 5% of axial chord length upstream of the leading edge plane and from immediately downstream of the trailing edge plane. FIG. 10 shows height contours for the upper endwall and FIG. 11 shows height contours for the lower endwall.

The upper endwall has a "peak" or convexly profiled region on the pressure surface side of the passage, about 8% of the axial chord length in height, and a "trough" or concavely profiled region on the suction side with a maximum depth of about 10% of the axial chord length.

The lower endwall is more complex in shape. There is still a trough on the suction surface side of the passage in the mid-chord region, its maximum depth being about 6% of the axial chord length. Again, in the mid-chord region, the endwall peaks, relative to the baseline, on the pressure side of the passage. However, another peak, higher than the pressure side peak, is formed in the forward part of the passage, adjacent the suction surface of the aerofoil. This has the effect of creating a "snow-plough" shape running from the leading edge and further enhances the shape of the leading edge. The maximum height of the suction side peak is about 12% of the axial chord length.

The results of the CFD analyses show that the reverse compound lean shifts the mass flow toward the endwalls, increasing the local loading and passage vortex strength, but reducing the midspan loading. This gives reduced frictional losses in the mid-span region and increases the fraction of the span over which the flow is 2-D (and is thus unaffected by 3-D, secondary flows).

Figure 12:
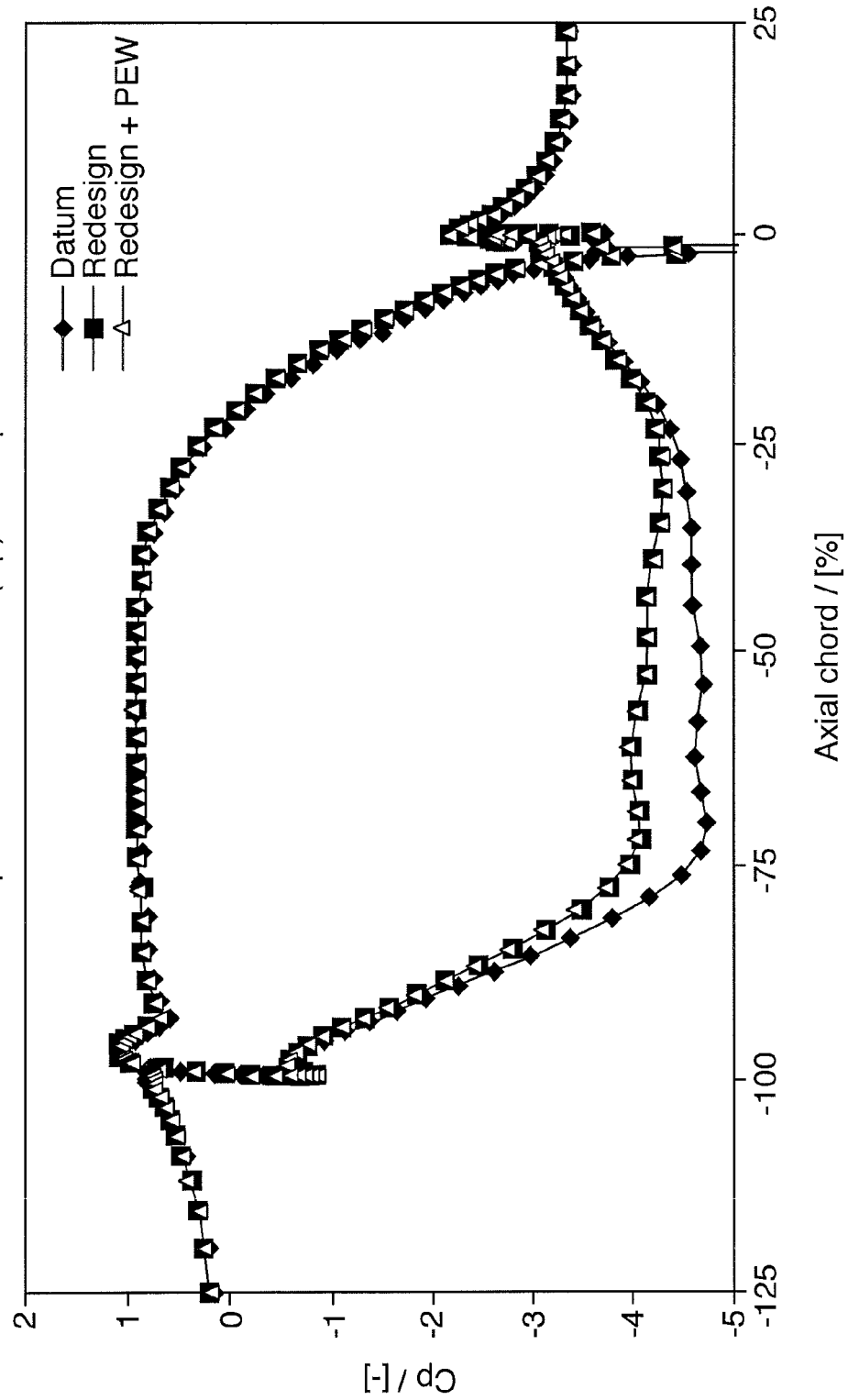
FIG. 12 shows values for the calculated static pressure coefficient, Cp, against percentage axial chord position for the midspan aerofoil section of the Datum, Redesign, and Redesign+PEW blades.

FIG. 12 shows the calculated static pressure coefficient, Cp, against percentage axial chord position for the midspan aerofoil section of the Datum, Redesign, and Redesign+PEW blades. 0 % axial chord position denotes the trailing edge and −100% axial chord position denotes the leading edge. Cp values between −125% and −100% are for values in the working fluid upstream of the leading edge, and Cp values between 0% and 25% are for values in the working fluid downstream of the trailing edge. Between −100% and 0%, Cp values are provided for locations on both the pressure and suction surfaces of the respective blade, the pressure surface having generally higher Cp values than the suction surface.

The midspan aerodynamic off-loading for the Redesign and Redesign+PEW blades case is evidenced by raised values of Cp (relative to the Datum blade) on the suction surface.

Figure 13:
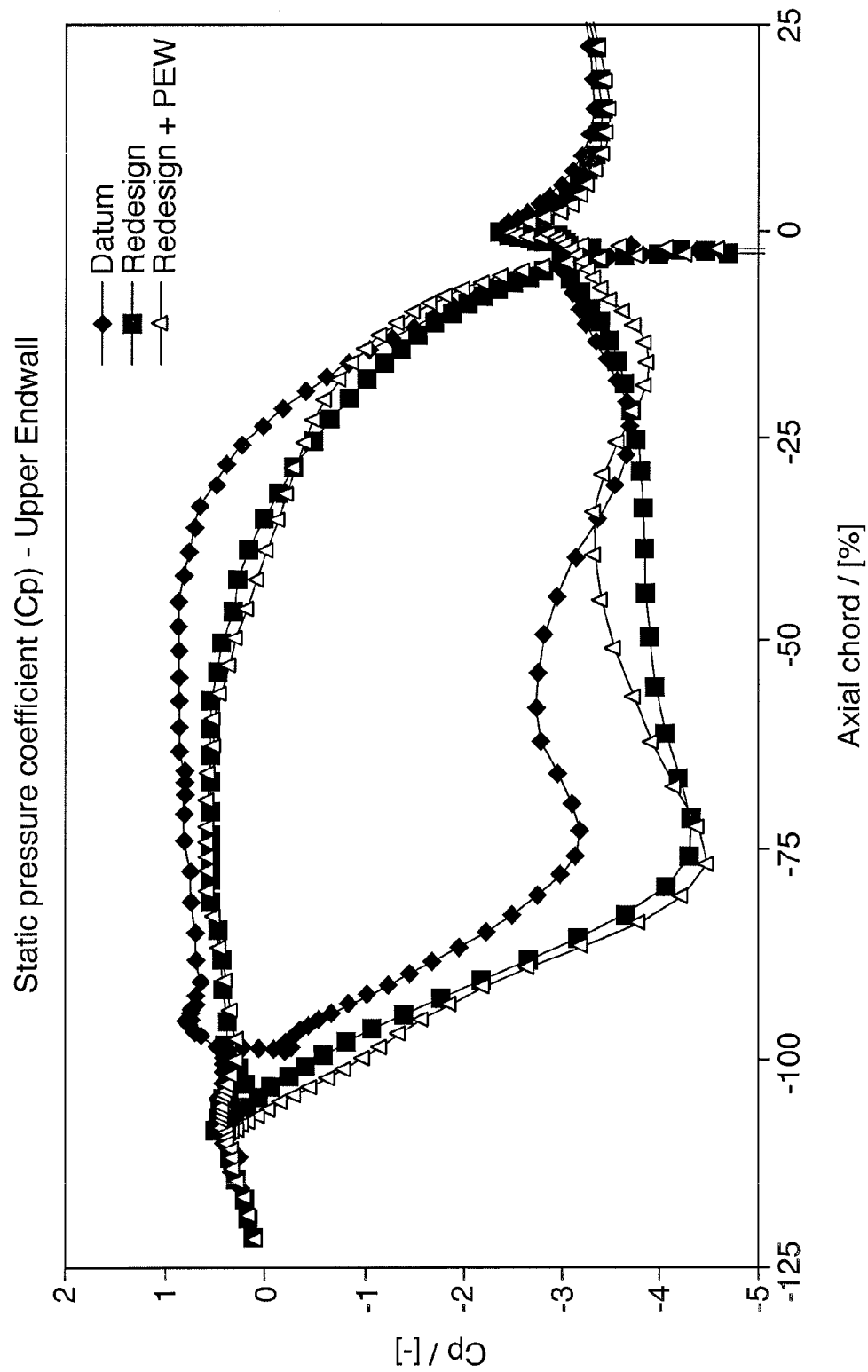
FIG. 13 shows calculated Cp values against percentage axial chord position for the aerofoil section at the intersection of the Datum, Redesign, and Redesign+PEW blades with an upper endwall.
Figure 14:
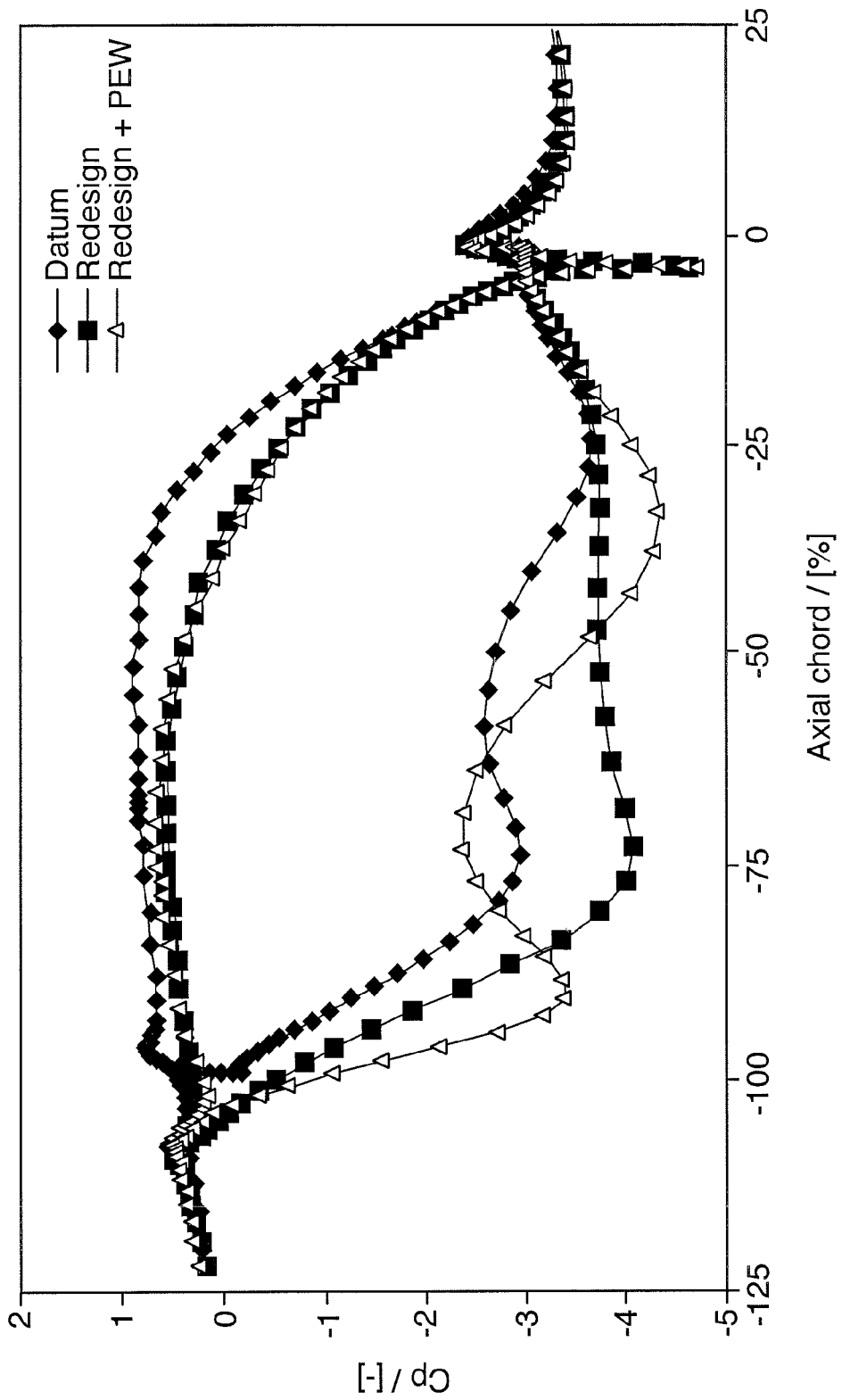
FIG. 14 shows calculated Cp values against percentage axial chord position for the aerofoil section at the intersection of the Datum, Redesign, and Redesign+PEW blades with a lower endwall.

FIG. 13 and FIG. 14 show the calculated Cp values around the Datum, Redesign, and Redesign+PEW blades at the intersections with respectively the upper and lower endwalls. Focusing on the Datum and Redesign geometries it can be seen that the loading on the suction surface increases (Cp drops) for the Redesign blade. The increased loading is caused by the flow redistribution produced by the reverse compound lean.

The forward positioning of the leading edge at the endwall in the Redesign blade mitigates the increase in loading, but does not eliminate it. In particular, the loading tends to move rearwards.

As discussed previously, in isolation the forward positioning of the leading edge at the endwall would result in a more concave pressure surface in the endwall region and a risk of increased diffusion. To avoid this, the pressure surface of the Redesign blade is filled in. The pressure side in-fill thickens the aerofoil and, as evidenced by the reduced Cp values for the pressure surface of the Redesign blade, off-loads the endwall aerofoil section over at least the mid-chord region of the blade (although some of the off-loading on the pressure surface is caused by the reverse compound lean). This reduces the cross-passage pressure gradient and thus the strength of secondary flows.

The reverse compound lean (and to some extent the forward positioning of the leading edge) moves flow towards the endwalls. This helps to confine the secondary flows to the endwall regions and thus enables endwall profiling to have a greater affect than might be the case in the Datum geometry— where the secondary flows would tend to migrate away from the endwalls. Thus focusing on the Redesign+PEW geometry, generally we find that the non-axisymmetric endwall profiling reduces the cross-passage pressure gradient in the mid-chord region of the blade, raising Cp on the aerofoil section suction side in this region of the passage. In conjunction with this, the loading is moved rearwards, making the endwall aerofoil section suction surface pressure distribution more "aft-loaded".

To a limited extent, this can be seen in the FIG. 13 Cp plot for the upper endwall. Cp values are raised (loading decreased) on the suction surface around −40% axial chord by the profiling, and reduced (loading increased) at about −10% axial chord. The loading near the leading edge is still, however, high.

The calculated Cp values shown in FIG. 14 demonstrate a stronger response to the more complex profiling on the lower endwall. The off-loading (Cp increasing) on the suction surface is greater and occurs earlier, the maximum off-loading being at about −70% axial chord. Relative to the Redesign geometry some loading has, again, been moved rearward as seen in the reduction in Cp centring on about −30% axial chord.

However, increased loading near the leading edge on the suction surface is still present. The endwall profiling starts at about 5% of axial chord length upstream of the leading edge, an aim being to create a "trough" on the suction surface side of the passage, the concave curvature of which diffuses the flow (raising Cp). However, for both the upper and lower endwalls, the upstream transition region into this "trough" is convex. The flow over this convex region accelerates and gives rise to the increased loading near the leading edge. The increased loading may be avoidable, however, by moving the start of the profiling further upstream.

Along with the reverse compound lean, the endwall profiling tends to load up the endwall aerofoil section pressure distribution in the leading edge region, especially on the suction surface side. This demonstrates the importance of the forward positioning of the leading edge in off-loading this region.

The beneficial effects of the blade and endwall modifications discussed above have been experimentally verified in a low speed linear cascade using the Datum and Redesign+PEW geometries.

Figure 15:
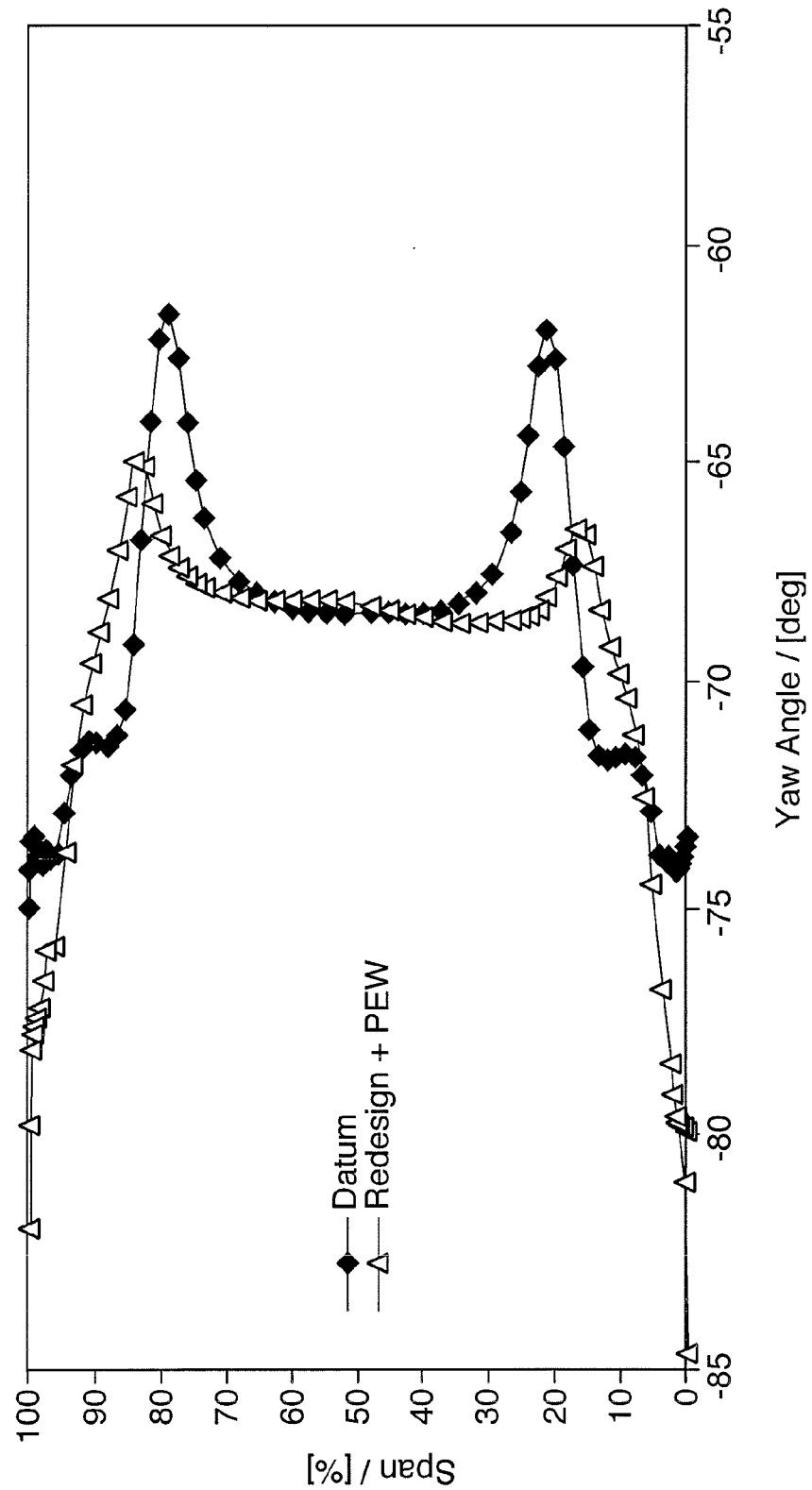
FIG. 15 shows pitch mass averaged, measured values of yaw angle at different span positions at a distance of 28% of axial chord length downstream of the trailing edge for two linear cascades containing respectively the Datum and Redesign+PEW blades.
Figure 16:
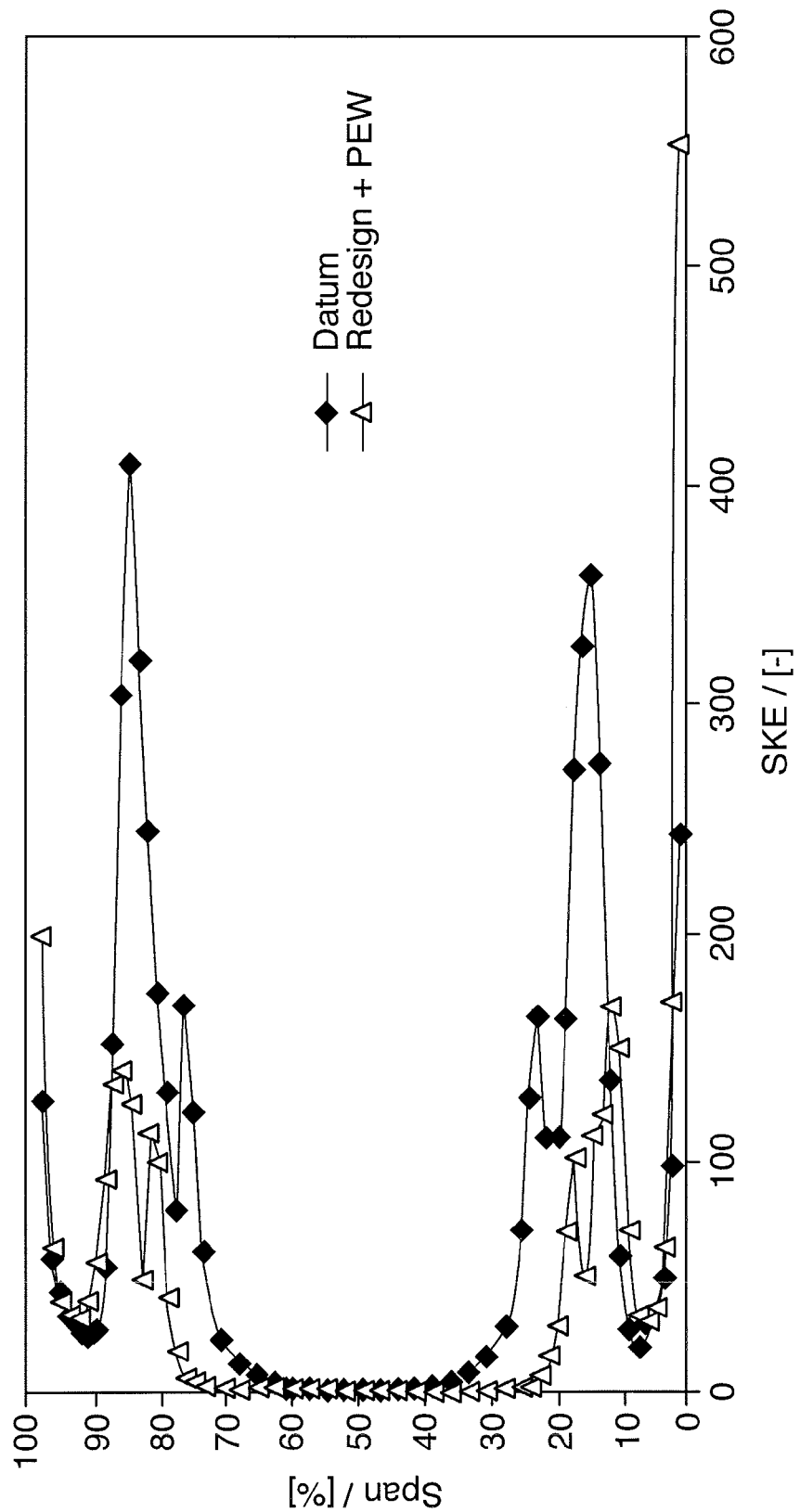
FIG. 16 shows pitch mass averaged, measured values of secondary kinetic energy coefficient at different span positions at a distance of 28% of axial chord length downstream of the trailing edge for two linear cascades containing respectively the Datum and Redesign+PEW blades.
Figure 17:
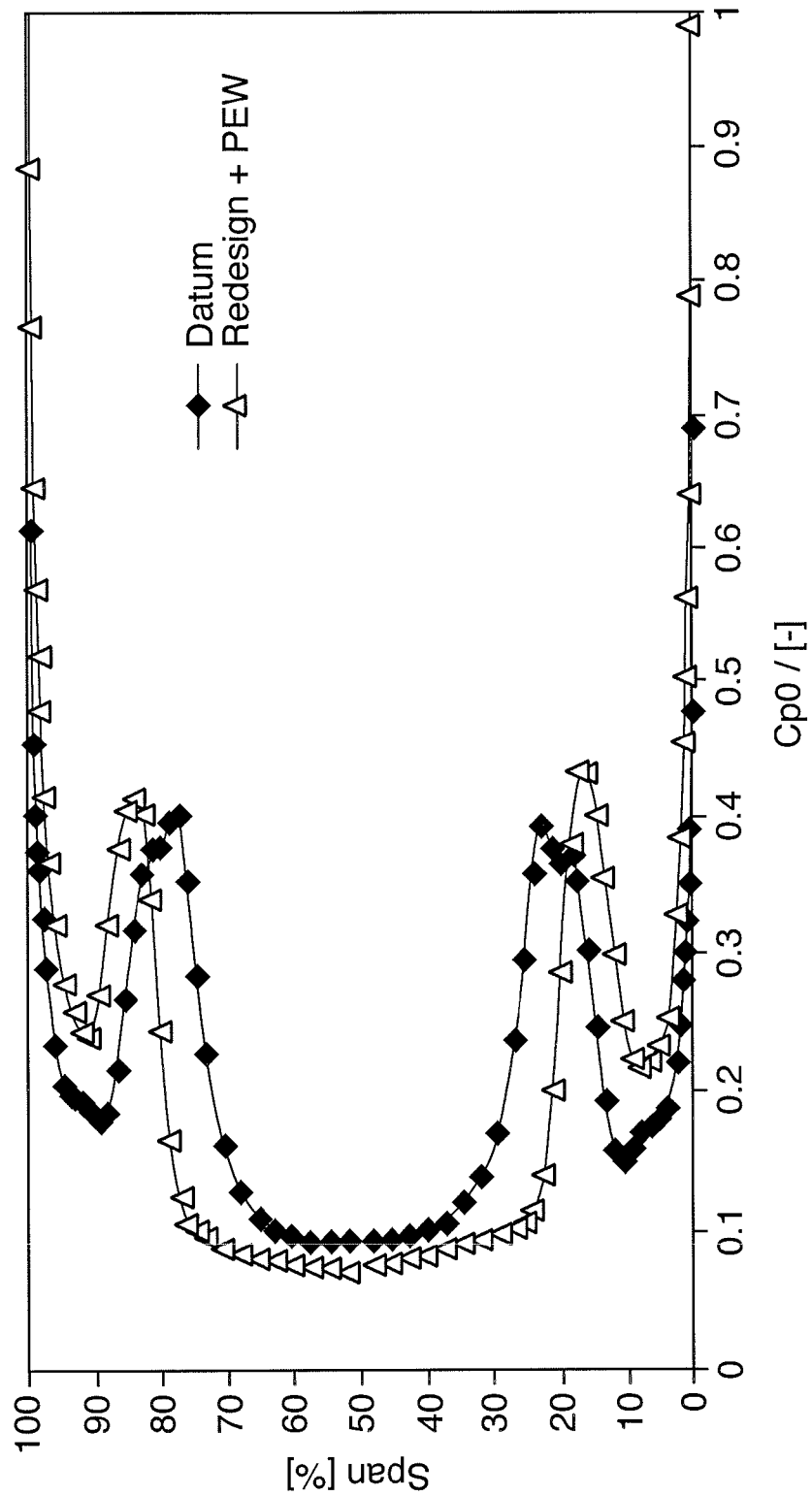
FIG. 17 shows pitch mass averaged, measured values of total pressure loss at different span positions at a distance of 28% of axial chord length downstream of the trailing edge for two linear cascades containing respectively the Datum and Redesign+PEW blades.

Measurements of yaw angle (FIG. 15), secondary kinetic energy coefficient (FIG. 16) and total pressure loss (FIG. 17) were taken across the span at a distance of 28% of axial chord length downstream of the trailing edge for the two blade geometries. The measurements were mass averaged across the pitch. The secondary kinetic energy coefficient is a measure of the angular kinetic energy of rotation in the vortical flow regions.

The pitch averaged yaw angle is sensitive to the level of secondary flow, particularly the passage vortex intensity. For the Datum geometry there are local minima in the yaw angle profile at about 20% and 80% span. Since the yaw angle here is less than that in the midspan undisturbed 2-D region, this is known as underturning. The maximum underturning (i.e. the difference between the local minima and the midspan yaw angles) is about 7° for the Datum geometry. For the Redesign+PEW geometry the local minima in the yaw angle have moved towards their respective endwalls and the maximum under turning has been reduced to about 2°. This indicates that the Redesign+PEW geometry has significantly reduced the strength of the secondary flow.

The pitch averaged secondary kinetic energy coefficient profiles confirm this result. Local maxima at about 15% and 85% span for the Datum geometry have been significantly reduced for the Redesign+PEW geometry, which is indicative of weaker secondary flows.

Examination of the pitch averaged total pressure loss shows that the central low loss region of the blades, where the flow is largely 2-D, has been increased from about 40% of the span for the Datum geometry to about 60% of span for the Redesign+PEW geometry. The loss cores at about 20% and 80% of span for the Datum geometry have moved outward toward their adjacent endwalls for the Redesign+PEW geometry. The loss cores seem to have become deeper but narrower. Overall there are net loss reductions with the Redesign+PEW geometry: 19% for the upper half of the passage, 11% for the lower half of the passage, and 15% for the cascade as a whole.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The references cited herein are incorporated by reference.

What is claimed is:

1. A circumferential row of aerofoil members which, in use, span an annular duct for carrying a flow of compressible fluid, the duct being centred on a rotational axis of a turbomachine, the row comprising aerofoil members, each aerofoil member having a pressure surface and a suction surface, wherein pressure and suction surfaces of neighbouring aerofoil members bound respective sectoral passages which receive the flow of compressible fluid, and the row comprises a radial endwall to which the tangent to the trailing edge of each aerofoil member at midspan is substantially orthogonal, wherein each aerofoil member has reverse compound lean, and further has a leading edge which has a position at the radial endwall which is upstream of its position at midspan, wherein the radial endwall at each sectoral passage has a non-axisymmetrical cross-section formed by a region that, in meridional section, is convexly profiled immediately adjacent the pressure surface and a region that, in meridional section, is concavely profiled immediately adjacent the suction surface, wherein the axial chord of the aerofoil section of the aerofoil member at the endwall is in the range of from 5% to 30% longer than the axial chord of the aerofoil member at midspan, and wherein, with increasing distance from the endwall, the leading edge travels downstream until, at a distance along the leading edge from the endwall which is in the range of from 10% to 100% of the total distance along the leading edge from endwall to midspan, the leading edge is at the same streamwise position that it assumes at midspan.

2. A row of aerofoil members according to claim 1, wherein the reverse compound lean results in the aerofoil member trailing edge position at midspan being circumferentially deflected, relative to the trailing edge position at the endwall, by at least 5% of the pitch between aerofoil members.

3. A row of aerofoil members according to claim 1, wherein the reverse compound lean results in the trailing edge position at midspan being circumferentially deflected, relative to the trailing edge position at the endwall, by no more than 50% of the pitch between aerofoil members.

4. A row of aerofoil members according to claim 1, wherein, in a surface swept out by rotating the tangent to the trailing edge at midspan around the axis of the turbomachine, the reverse compound lean results in an angle of inclination of at least 5° between the tangent to the trailing edge at midspan and the projection, along the direction of said axis and into said surface, of the tangent to the trailing edge at the endwall.

5. A row of aerofoil members according to claim 1, wherein, in a surface swept out by rotating the tangent to the trailing edge at midspan around the axis of the turbomachine, the reverse compound lean results in an angle of inclination of up to 40° between the tangent to the trailing edge at midspan and the projection, along the direction of said axis and into said surface, of the tangent to the trailing edge at the endwall.

6. A row of aerofoil members according to claim 1, wherein the incidence angle of the aerofoil member at the endwall and at 100% design speed of the turbomachine is within ±5° of the incidence angle of the aerofoil member at midspan and at 100% design speed.

7. A row of aerofoil members according to claim 1, wherein, r is the distance along the leading edge over which the leading edge is upstream of the leading edge at midspan, a is the distance at the endwall by which the leading edge is upstream of the leading edge at midspan, and the ratio r:a is at least 1:9.

8. A row of aerofoil members according to claim 1, wherein r is the distance along the leading edge over which the leading edge is upstream of the leading edge at midspan, a is the distance at the endwall by which the leading edge is upstream of the leading edge at midspan, and the ratio r:a is no more than 9:1.

9. A row of aerofoil members according to claim 1, wherein the ratio of the trailing edge span of the aerofoil member to its axial chord length at midspan is up to 10:1.

10. A row of aerofoil members according to claim 1, wherein the aerofoil section of the aerofoil member at the endwall has a concave pressure surface which is shaped such that three tangents can be drawn to the pressure surface at respective positions adjacent the leading edge, adjacent the trailing edge, and between the leading and trailing edges, and a fourth tangent can be drawn to the suction surface, the four tangents being parallel to each other and to the plane of the meridional section containing the leading edge at the endwall, and wherein the ratio $\Delta 1 : \Delta 2$ is no more than 0.3, $\Delta 1$ being the circumferential spacing between the tangent to the pressure surface adjacent the leading edge and the tangent to the pressure surface between the leading and trailing edges, and $\Delta 2$ being the circumferential spacing between the tangent to the pressure surface adjacent the leading edge and the tangent to the suction surface.

11. A row of aerofoil members according to claim 1, wherein the endwall further has a region that, in meridional section, is convexly profiled immediately adjacent the suction surface and upstream of the concavely profiled region.

12. A row of aerofoil members according to claim 1, wherein the endwall has an axisymmetric cross-section upstream of the leading edge of the aerofoil member at the endwall.

13. A row of aerofoil members according to claim 1, wherein the endwall has an axisymmetric cross-section downstream of the trailing edge of the aerofoil member at the endwall.

14. A row of aerofoil members according to claim 1, which is one of a row of turbine rotor blades or row of turbine stator vanes.

15. A row of aerofoil members according to claim 1, further comprising a second radial endwall to which the tangent to the trailing edge of each aerofoil member at midspan is substantially orthogonal.

16. A row of aerofoil members according to claim 15, wherein the second radial endwall at each sectoral passage has a non-axisymmetrical cross-section formed by a region that, in meridional section, is convexly profiled immediately adjacent the pressure surface and a region that, in meridional section, is concavely profiled immediately adjacent the suction surface.

17. An aerofoil member for use in a circumferential row of aerofoil members that span a turbomachine annular duct centred on a rotational axis thereof, the duct for carrying a flow of compressible fluid, each aerofoil member having a pressure surface and a suction surface, wherein pressure and suction surfaces of neighbouring aerofoil members bound respective sectoral passages which receive the flow of compressible fluid, and a tangent to the trailing edge of each aerofoil member at midspan is substantially orthogonal to a radial endwall in the row, wherein each aerofoil member has reverse compound lean, and further has a leading edge which has a position at the radial endwall which is upstream of its position at midspan, wherein the radial endwall at each sectoral passage has a non-axisymmetrical cross-section formed by a region that, in meridional section, is convexly profiled immediately adjacent the pressure surface and a region that, in meridional section, is concavely profiled immediately adjacent the suction surface, wherein the axial chord of the aerofoil section of the aerofoil member at the endwall is in the range of from 5% to 30% longer than the axial chord of the aerofoil member at midspan, and wherein, with increasing distance from the endwall, the leading edge travels downstream until, at a distance along the leading edge from the endwall which is in the range of from 10% to 100% of the total distance along the leading edge from endwall to midspan, the leading edge is at the same streamwise position that it assumes at midspan.

18. A turbomachine comprising:

an annular duct for carrying a flow of compressible fluid, the duct being centred on a rotational axis of the turbomachine; and a circumferential row of aerofoil members which span said annular duct, each of said aerofoil members having a pressure surface and a suction surface, wherein pressure and suction surfaces of neighbouring aerofoil members bound respective sectoral passages which receive the flow of compressible fluid, and the row includes a radial endwall to which the tangent to the trailing edge of each aerofoil member at midspan is substantially orthogonal, wherein each aerofoil member has reverse compound lean, and further has a leading edge which has a position at the endwall which is upstream of its position at midspan, wherein the radial endwall at each sectoral passage has a non-axisymmetrical cross-section formed by a region that, in meridional section, is convexly profiled immediately adjacent the pressure surface and a region that, in meridional section, is concavely profiled immediately adjacent the suction surface, wherein the axial chord of the aerofoil section of the aerofoil member at the endwall is in the range of from 5% to 30% longer than the axial chord of the aerofoil member at midspan, and wherein, with increasing distance from the endwall, the leading edge travels downstream until, at a distance along the leading edge from the endwall which is in the range of from 10% to 100% of the total distance along the leading edge from endwall to midspan, the leading edge is at the same streamwise position that it assumes at midspan.

* * * * *